US006533970B1

(12) United States Patent
Gregg

(10) Patent No.: US 6,533,970 B1
(45) Date of Patent: Mar. 18, 2003

(54) METHOD FOR MAKING AERATED CONCRETE BLOCKS HAVING AT LEAST ONE PASSAGEWAY DRILLED THEREIN

(75) Inventor: Frederick Browne Gregg, Leesburg, FL (US)

(73) Assignee: Consolidated Minerals, Inc., Leesburg, FL (US)

( * ) Notice: Subject to any disclaimer, the term of this patent is extended or adjusted under 35 U.S.C. 154(b) by 9 days.

(21) Appl. No.: 09/608,113

(22) Filed: Jun. 30, 2000

(51) Int. Cl.[7] ......................... B29B 17/00; B28B 11/12; B28B 11/14; B28B 1/48; B28B 1/50

(52) U.S. Cl. ...................... 264/37.29; 264/42; 264/155; 264/156; 264/157; 366/3; 366/4; 53/399; 53/438; 53/441

(58) Field of Search ................................ 264/155, 156, 264/37.29, 42, 157; 366/3, 4; 53/399, 438, 441, 529, 556, 582; 425/4 R, 817 R, 217, 289, 297, 301, 403.1

(56) References Cited

U.S. PATENT DOCUMENTS

| | | | | | |
|---|---|---|---|---|---|
| 142,475 | A | | 9/1873 | Hyatt | 52/604 |
| 1,656,097 | A | * | 1/1928 | Dahl | 425/297 |
| 2,315,256 | A | | 3/1943 | Haegele et al. | |
| 2,438,613 | A | | 3/1948 | Malthouse | 52/604 |
| 2,472,221 | A | | 6/1949 | Malthouse | 52/604 |
| 3,356,013 | A | * | 12/1967 | Konger | 100/14 |
| 3,407,457 | A | * | 10/1968 | Blom | 425/307 |
| 3,758,652 | A | * | 9/1973 | Jebens | 264/42 |
| 3,780,484 | A | | 12/1973 | Muse | 52/585 |
| 3,824,755 | A | | 7/1974 | Hartnell | 52/314 |
| 4,528,883 | A | | 7/1985 | Göransson et al. | 83/870 |
| 4,613,472 | A | * | 9/1986 | Svanholm | 249/80 |
| 4,670,204 | A | * | 6/1987 | Cruise | 264/333 |

(List continued on next page.)

FOREIGN PATENT DOCUMENTS

| | | | | | |
|---|---|---|---|---|---|
| GB | 2196276 | A | | 4/1988 | B23B/36/16 |
| JP | 9-66518 | A | * | 3/1997 | B28D/1/14 |
| WO | WO-86/06774 | A1 | * | 11/1986 | E04B/2/08 |

OTHER PUBLICATIONS

Article from Granofacts by WATTYL Granosite Specialist Architectural Coatings dated Aug. 1999. Title: AAC & Granosite.

BuildingGreen.com, "Environmental Building News"; vol. 5, No. 2 published Mar./Apr. 1996; pp. 1–4.

*Primary Examiner*—Jan H. Silbaugh
*Assistant Examiner*—Michael I. Poe
(74) *Attorney, Agent, or Firm*—Allen, Dyer, Doppelt, Milbrath & Gilchrist, P.A.

(57) ABSTRACT

A method for making aerated concrete blocks includes dispensing materials for making aerated concrete into a mold and allowing the materials to rise and stiffen into a body. The body may be divided into an array of blocks which are then cured. At least one passageway may be formed in each block, such as by drilling. The drilling may include drilling a plurality of spaced apart passageways through each block, and each passageway may have a circular cylindrical shape. The passageways permit easier grasping by the mason, reduce the weight without significantly compromising strength, and facilitate positioning of blocks during construction of a wall to facilitate the placement of vertical reinforcing members in aligned passageways. The positioning of the passageways in each of the blocks may assist alignment of adjacent passageways, especially at wall corners. The drilling may include providing a plurality of drills and causing relative movement between the drills and at least one group of blocks to simultaneously drill the one or more passageways in each block of the group. The step of causing relatively movement may include grasping and moving the group of blocks along a predetermined path while the plurality of drills remain stationary.

45 Claims, 8 Drawing Sheets

U.S. PATENT DOCUMENTS 4,694,629 A 9/1987 Azimi ......................... 52/611
4,902,211 A 2/1990 Svanholm .................... 425/88
4,908,217 A 3/1990 Colley ........................ 425/253
4,947,610 A 8/1990 Koerner ....................... 52/585
5,020,945 A * 6/1991 Becker ....................... 408/1 R
5,359,816 A 11/1994 Iacouides ..................... 52/274
5,460,466 A 10/1995 Kenny et al. ............... 411/179
5,665,290 A 9/1997 Koslowski et al. ......... 264/669
5,775,047 A * 7/1998 Jensen ........................ 106/672
5,913,791 A * 6/1999 Baldwin ...................... 52/422
5,951,210 A * 9/1999 Maguire et al. ............ 405/284
6,000,186 A 12/1999 Fielding et al. ............... 52/564
6,088,987 A 7/2000 Simmons et al. .......... 52/592.6
6,161,357 A 12/2000 Altemus .................... 52/592.6

* cited by examiner

METHOD FOR MAKING AERATED CONCRETE BLOCKS HAVING AT LEAST ONE PASSAGEWAY DRILLED THEREIN

FIELD OF THE INVENTION

The present invention relates to building materials, and, more particularly, to a method for making lightweight blocks formed of aerated concrete.

BACKGROUND OF THE INVENTION

Autoclaved aerated concrete is a high-quality, load-bearing, as well as insulating building material produced in a wide range of product sizes and strengths. The material has been used successfully in Europe and is now among widely used wall building materials in Europe with increasing market shares in other countries. Aerated concrete is a steam cured mixture of sand or pulverized fuel ash, cement, lime and an aeration agent. High pressure steam curing in an autoclave produces a physically and chemically stable product with an average density being about one fifth that of normal concrete. The material includes no-connecting air cells, and this gives aerated concrete some of it its unique and advantageous properties. Aerated concrete enjoys good strength, low weight, good thermal insulation properties, good sound deadening properties, and has a high resistance to fire.

Aerated concrete may be used in panels or individual building blocks. It has been used for residences; commercial, industrial and agricultural buildings; schools; hospitals; etc. and is a good material in most all climates. Panels or blocks may be joined together using common mortar or thin set glue mortar or adhesive. Aerated concrete has durability similar to conventional concrete or stone and a workability perhaps better than wood. The material can be cut or sawn and readily receives expandable fasteners. Aerated concrete has a thermal conductivity six to ten times better than conventional concrete. The material is also non-rotting, non-toxic and resistant to termites.

As disclosed in U.S. Pat. No. 4,902,211 to Svanholm, for example, aerated concrete may typically be produced as follows. One or several silica containing materials, such as sand, shale ashes or similar materials, as well as one or more calcareous binders, such as lime and/or cement, are mixed with a rising or aeration agent. The aeration agent typically includes aluminum powder which reacts with water to develop hydrogen gas at the same time a mass of what can be considered a calcium silicate hydrate forms. The development of hydrogen gas gives the mass macroporosity. The rising mass is typically contained within a mold. After rising, the mass is permitted to stiffen in the mold forming a semiplastic body which has low strength, but which will keep together after removal from the mold.

After a desired degree of stiffness is achieved and the body is removed from the mold, the body may typically be divided or cut by wires into separate elements having the desired shape, such as building blocks or larger building panels. The divided body is positioned in an autoclave where it is steam cured at high pressure and high temperature to obtain suitable strength. The body is then advanced to a separation station where the adjacent building blocks or panels are separated from one another. The blocks are packaged, such as onto pallets for storage and transportation.

Because the building blocks are divided from the solid mass of material, the blocks are solid generally rectangular bodies. The solid blocks are still relatively lightweight, although somewhat awkward to handle by the mason. The blocks may come in various conventional block sizes, such as typically about two feet in length with various widths and heights.

In most block walls, including those formed of aerated concrete blocks, it may also be desirable to add vertical reinforcements. This may be so especially in coastal areas or other locations susceptible to high winds. For example, it may be desired to have a vertical reinforcing member, such as a reinforcing bar, periodically secured to or secured within the wall and extending from the bottom of a block wall to the top of the wall to meet certain building codes.

To provide the periodic vertical reinforcing, one conventional practice is to drill a passageway through the blocks upon completion of the entire height of the wall to receive a vertical reinforcing member. Such a process is not only awkward, but is also time consuming. Alternately, a slot may be cut into a surface of the wall to receive a vertical reinforcing member. Such, conventional ad hoc reinforcing techniques carried out at the building site may not always yield consistent results. Moreover, the time needed for such vertical reinforcing measures increases the costs of construction using conventional solid aerated concrete blocks.

SUMMARY OF THE INVENTION

In view of the foregoing background, it is therefore an object of the present invention to provide an efficient and cost effective method for making aerated concrete blocks of a type that will speed construction at the building site, and which also facilitate vertical reinforcement of walls formed from the blocks.

This and other objects, features and advantages in accordance with the invention are provided by a method for making aerated concrete blocks wherein the blocks are formed to have one or more passageways extending therethrough. More particularly, the method may include dispensing materials for making aerated concrete into a mold and allowing the materials to rise and stiffen into a body. The body may be divided into an array of blocks and then cured. At least one passageway may be formed extending through each block, such as formed by drilling, for example. Each block may have a plurality of spaced apart passageways formed or drilled therein, and each passageway may have a circular cylindrical shape. The passageways provide easier grasping by the mason, reduce the weight without significantly compromising strength, and may be aligned in a wall during construction at a building site to facilitate the placement of vertical reinforcing members in the wall.

The drilling, for example, may comprise providing a plurality of drills and causing relative movement between the drills and at least one group of blocks to simultaneously drill the one or more passageways in each block. The step of causing relative movement may include grasping and moving the group of blocks along a predetermined path while the plurality of drills remain stationary. In one embodiment, the drills are directed substantially vertically upward, and the predetermined path is substantially vertical so that waste from drilling will fall by gravity for recycling. Recycling of the waste also reduces the costs of production, since less virgin materials are then required.

Another important advantage relates to the shape of each cured block formed in accordance with the method of the present invention. In particular, each block may have a generally rectangular shape defining a length between opposing ends, a width between opposing sides, and a height between a top and bottom. The at least one passageway may comprise first and second passageways, for example, extending in the height direction between the top and bottom. In addition, each first and second passageway may be centered inwardly from the opposing sides and also have an axis centered inwardly from a respective adjacent end a distance of about one-half the width. This configuration allows for alignment of the passageways in adjacent blocks, especially at wall corners.

The length of each block may be in a range of about 16 to 24 inches, the width may be in a range of about 8 to 12 inches, and the height may be in a range of about 8 to twelve inches. The length may also range from about 2 to 3 times the width for some embodiments. In one variation, a third passageway may be provided to extend between the bottom and the top. This third passageway is preferably centered inwardly from opposing sides and inwardly from opposing ends.

The method may also include packaging the blocks after drilling for storage and transportation. For example, the packaging may comprise packaging a group of blocks on each of a plurality of pallets. The method may also comprise mixing the materials prior to dispensing the materials into the mold. The materials may comprise sand or ash, cement, lime, water, and an aeration agent, such as aluminum.

The method may also include releasing the body from the mold prior to dividing the body, and trimming at least one side of the body during the dividing. The dividing and/or trimming may be carried out using cutting wire to form a series of laterally extending and vertically extending cuts through the body.

The curing may comprise subjecting the array of blocks to an elevated temperature and an elevated pressure for a predetermined time. For example, the curing may be carried out in an autoclave using steam. In addition, the method may also include separating the blocks after curing.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation is used in alternate embodiments to indicate similar elements.

Figure 1:
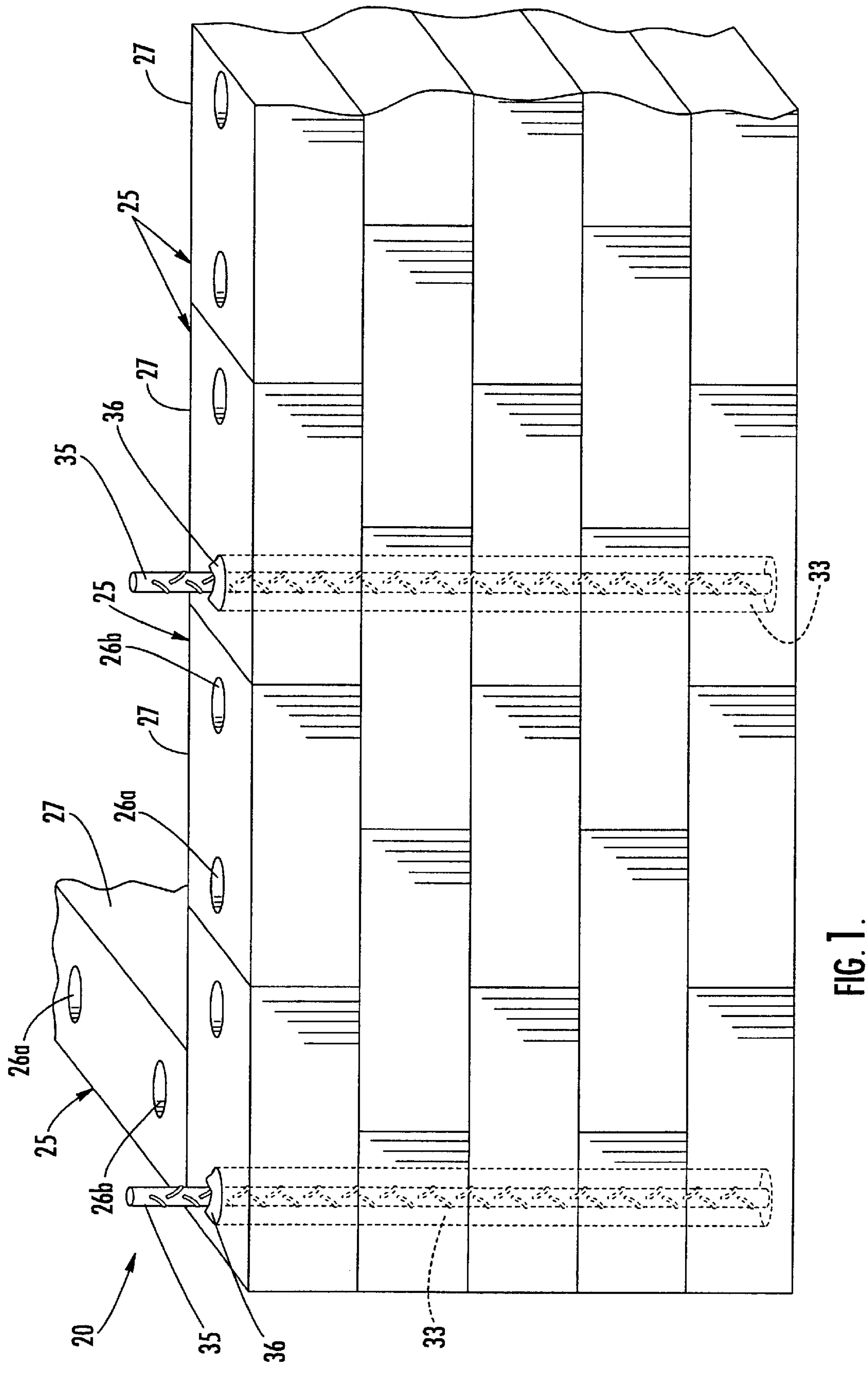
FIG. 1 is a perspective view of a building wall corner portion constructed using aerated concrete blocks in accordance with the present invention.
Figure 2:
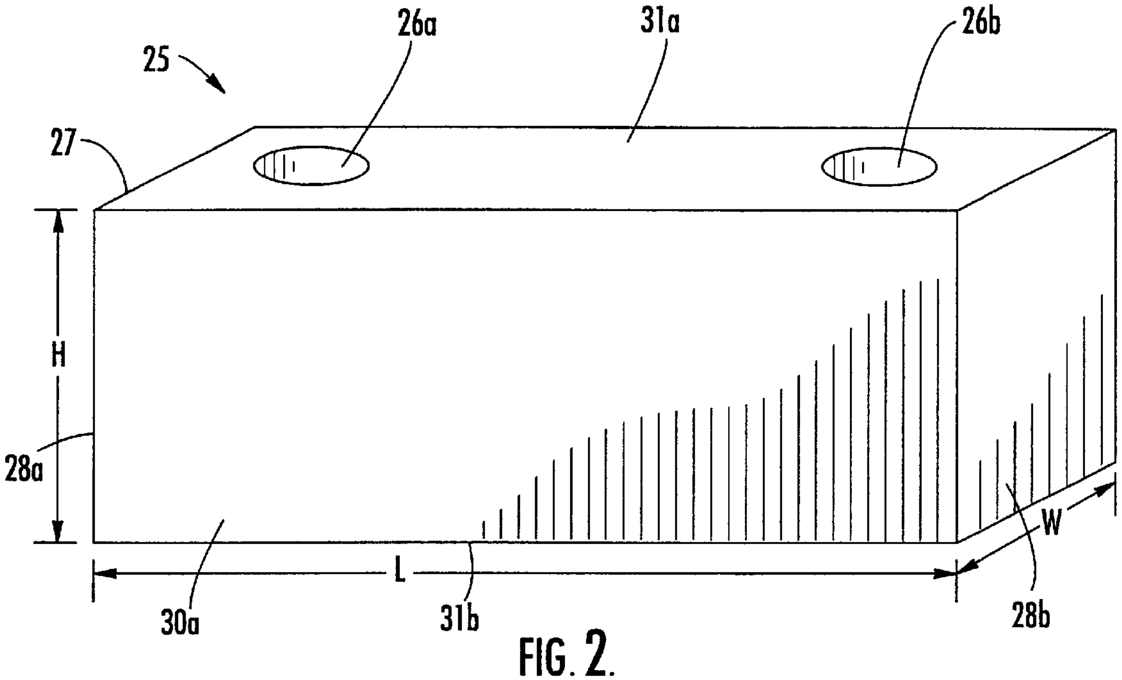
FIG. 2 is a perspective view of an embodiment of the aerated concrete block as used in the wall of FIG. 1.
Figure 3:
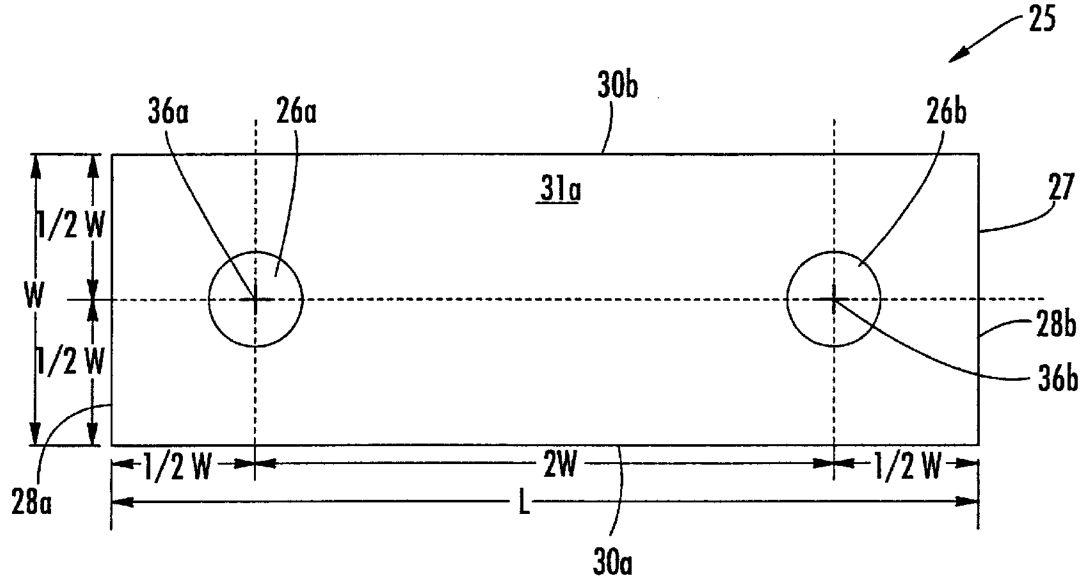
FIG. 3 is a top plan view of the aerated concrete block of FIGS. 1 and 2.

Referring initially to FIGS. 1–3, an embodiment of the aerated concrete block 25 and its use in accordance with the present invention are first described. More particularly, the aerated concrete block 25 is a manufactured aerated concrete block, such as for delivery to a building site to be joined together with adjacent aerated concrete blocks to form a building wall.

The aerated concrete blocks 25 may be assembled to form a right angle wall corner portion 20 as shown in FIG. 1. The aerated concrete blocks 25 addresses a number of shortcomings of conventional solid aerated concrete blocks. In particular, as shown in the illustrated embodiment, first and second passageways 26*a,* 26*b* are provided in the generally rectangular body 27 of the block 25. The body 27 has a generally rectangular shape defining a length L between opposing ends 28*a,* 28*b,* a width W between opposing sides 30*a,* 30*b,* and a height H between a top and bottom 31*a,* 31*b.* The first and second passageways 26*a,* 26*b* extend in a height H direction through the aerated concrete body 27. Each of the first and second passageways 26*a,* 26*b* are positioned inwardly from opposing sides 30*a,* 30*b* and also positioned inwardly from a respective end 28*a,* 28*b* to facilitate alignment with passageways of adjacent blocks.

The alignment of adjacent blocks 25 is shown with particular reference to the wall corner portion 20 of FIG. 1. Stated in other words, a plurality of the manufactured aerated concrete blocks 25 may be joined together and relatively positioned so that at least some passageways 26*a,* 26*b* in adjacent blocks are vertically aligned to define at least one reinforcing member receiving channel 33 extending vertically through the building wall 20. The blocks 25 may be joined together using conventional thin set mortar or adhesives as will be readily appreciated by those skilled in the art. In addition, the wall portion 20 may include at least one reinforcing member, such as a rebar or steel rod 35 positioned in the at least one reinforcing member receiving channel 33.

Each vertical reinforcing member 35 may be secured into the receiving channel 33 by filling with a hardenable mass of material 36, such as poured in place concrete or mortar as will be readily appreciated by those skilled in the art. The vertical reinforcing members 35 may be secured to a ring joist or roof member or other building portion as will also be appreciated by those skilled in the art. The vertical reinforcing members 35 may be positioned within a predetermined minimum spacing to satisfy strength and/or building code requirements. Of course, such requirements are typically of interest in coastal and other areas that may be subject to high wind loads. For example, some building codes may require such reinforcements 35 spaced no more than four feet apart. Other spacings are also possible and can be accommodated by the aerated concrete block 25 including one or more passageways in accordance with the present invention.

In the illustrated block 25 of FIGS. 1–3, each of the first and second passageways 26*a,* 26*b* is centered inwardly from opposing sides 30*a,* 30*b.* As will be readily understood by those of skill in the art, such positioning of the passageways 26*a,* 26*b* facilitates the alignment of passageways in adjacent blocks 25 at the right angle wall corner portion 20 as appreciated with particular reference to FIG. 1. As can perhaps best be appreciated by the plan view of FIG. 3, the first and second passageways 26*a,* 26*b* of the block 25 may have respective axes 36*a,* 36*b* positioned inwardly from a respective end 28*a,* 28*b* a distance of about one-half the width W. In the illustrated embodiment, the passageways 26*a,* 26*b* are also separated from one another by a distance of twice the width W. Considered in somewhat different terms, the length L is about twice the width W in this embodiment.

For typical uses, the aerated concrete block 25 may have a width W in a range of about eight to twelve inches. For example, a manufacturer may choose to offer the blocks 25 in three different widths of eight, ten or twelve inches. Other widths are also possible as will be appreciated by those skilled in the art. A typical length L for the blocks 25 may be about twenty-four inches, although the blocks may commonly range from about sixteen to twenty-four inches, and, of course, other lengths may also be used. The height H of the blocks 25 may be in a range of about eight to twelve inches for typical uses, and other heights are also possible.

The passageways 26*a,* 26*b* offer a number of advantages in addition to providing the receiving channels 33 for the vertical reinforcing members 35. For example, the passageways 26*a,* 26*b* permit the mason to readily grasp and transport the blocks 25 by positioning the hands on respective opposing ends 28*a,* 28*b* with the thumbs extending into the passageways as will be appreciated by those skilled in the art. In addition, the blocks 25 can be made lighter since less material is used, and without compromising the strength or other advantageous properties of the aerated concrete material as will also be appreciated by those skilled in the art.

Figure 4:
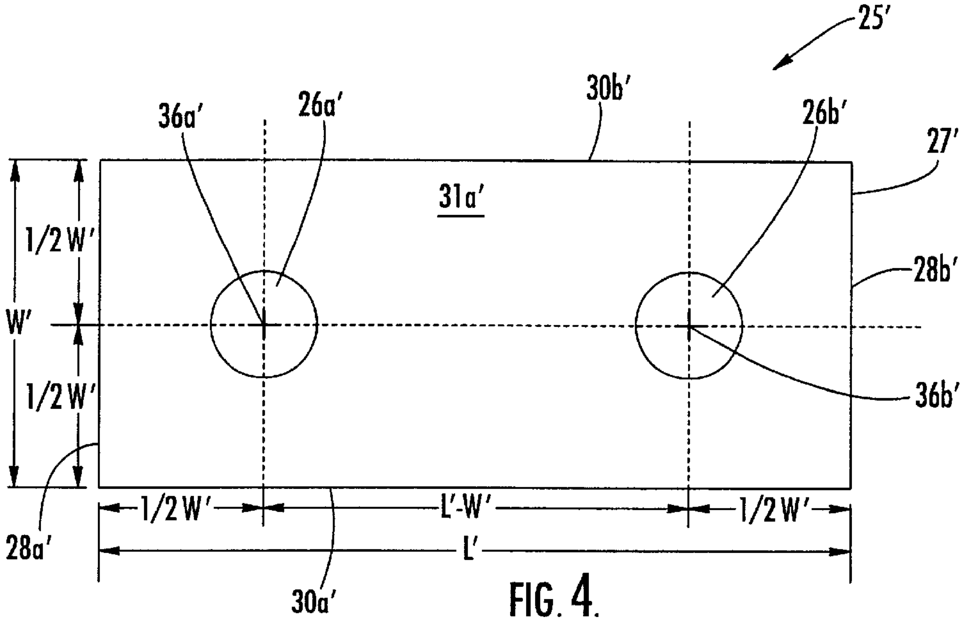
FIG. 4 is a top plan view of another embodiment of an aerated concrete block in accordance with the present invention.

Turning now additionally to FIG. 4, another embodiment of the aerated concrete block 25' in accordance with the invention is now described. In this embodiment of the block 25', the passageways 26*a*', 26*b*' are centered inwardly from opposing sides 30*a*', 30*b*' and have axes 36*a*', 36*b*' that are spaced inwardly from respective ends 28*a*', 28*b*' a distance of one-half the width W'. In other words, the passageways 26*a*', 26*b*' are positioned for alignment with adjacent blocks 25' such as for a right angle corner wall portion described above. The spacing between the axes 36*a*', 36*b*' of the passageways 26*a*', 26*b*' is given by the length minus the width, that is, L–W. This dimension or spacing may be selected to provide alignment of passageways 26*a*', 26*b*' between adjacent blocks away from the corner and as will be appreciated by those skilled in the art. For example, for a block length L' of twenty-four inches, a width W' of ten inches will provide such alignment as discussed in further detail below. In other words, the length L' may be about 2.4 times the width W' to provide for periodic alignment away from a corner.

Figure 5:
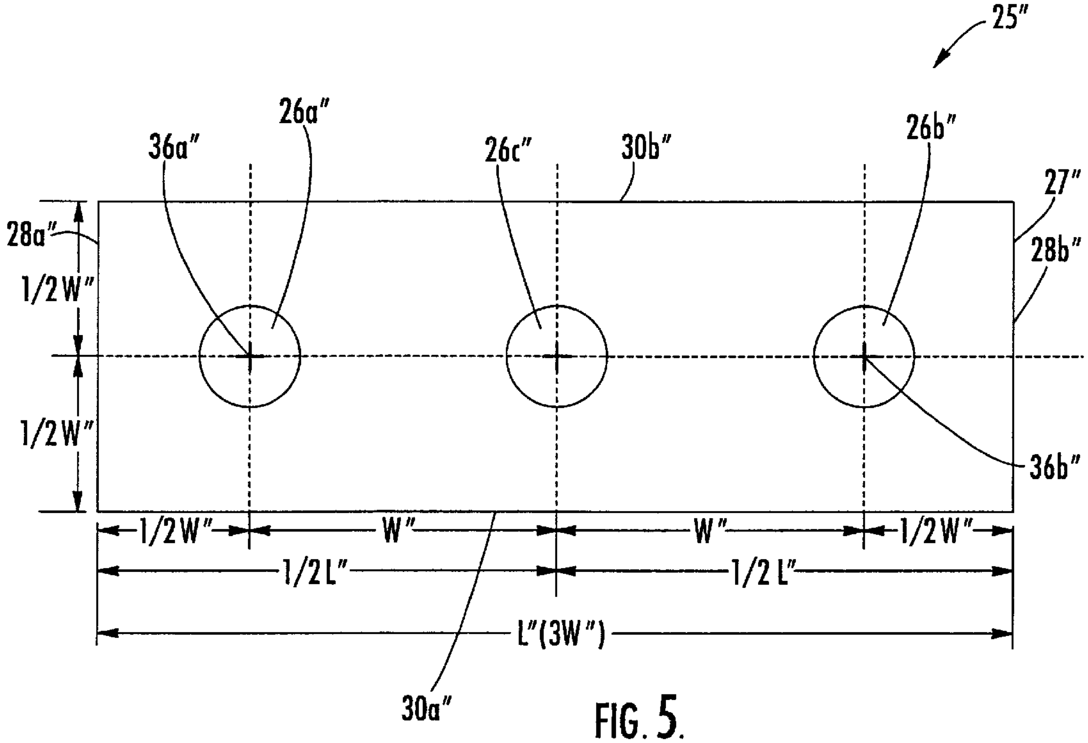
FIG. 5 is a top plan view of yet another embodiment of an aerated concrete block in accordance with the present invention.

Turning now additionally to FIG. 5, yet another embodiment of the aerated concrete block 25" in accordance with the invention is now described. This block 25" further includes a third passageway 26*c*" extending in the height H" direction and being positioned between the first and second passageways 26*a*", 26*b*". More particularly, as shown in the illustrated embodiment, the third passageway 26*c*" is centered inwardly from opposing sides 30*a*", 30*b*" and is also centered inwardly from opposing ends 28*a*", 28*b*". In some variations of this embodiment of the aerated concrete block 25", the length L" may be about three times the width W". For example, for a twenty-four inch length L", the corresponding width W" would be about eight inches. Of course, other spacings are also contemplated by the present invention. In addition, although three passageways 26*a*"–26*c*" are shown, more than three can also be provided in other embodiments of the invention.

In some embodiments, even one passageway may be advantageously used in accordance with the invention, although the two and three passageway versions offer a number of advantages for conventional block dimensions as will be appreciated by those skilled in the art. In addition, in some embodiments, the passageways need not be completely surrounded by adjacent material of the block. For example, a passageway could be formed which opens outwardly to a surface of the block, such as an end or side. Positioning of the passageways to be completely surrounded by adjacent block material does offer a number of advantages, such as, easier handling, easier alignment at corners, impact resistance, and perhaps a better overall appearance as will be appreciated by those skilled in the art.

In the illustrated embodiments of the blocks 25, 25' and 25", the passageways 26*a,* 26*b;* 26*a*'26*b*' and 26*a*"–26*c*" each have a generally circular cylindrical shape. The diameter of the passageways may typically range from about one to four inches in diameter, although other sizes are also possible. The size is dependent upon the width W of the block, the size of the vertical reinforcing member 35 to be accommodated, and the strength requirements of the block as will be appreciated by those skilled in the art. The cylindrical shape is also readily formed by drilling as will be explained further below. Other configurations of such passageways are also contemplated by the present invention as will also be appreciated by those skilled in the art, although the circular cylindrical shape is readily formed by drilling which is explained in greater detail below.

Figure 6:
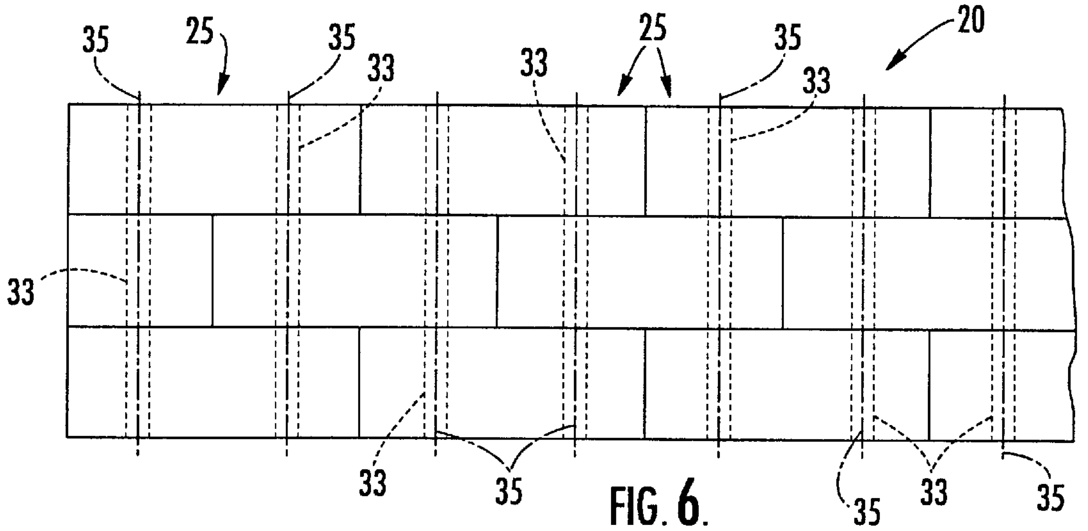
FIG. 6 is a side elevational view of a wall portion constructed using aerated concrete blocks of the type shown in FIGS. 1 and 2 and schematically illustrating alignment of passageways of adjacent blocks to define vertical reinforcing member receiving channels.
Figure 7:
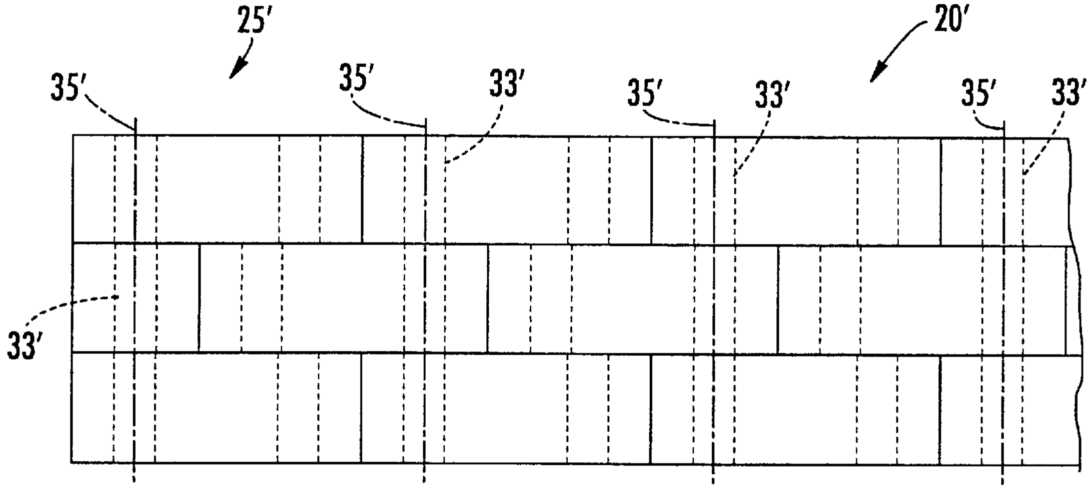
FIG. 7 is a side elevational view of a wall portion constructed using aerated concrete blocks of the type shown in FIG. 3 and schematically illustrating alignment of passageways of adjacent blocks to define vertical reinforcing member receiving channels.
Figure 8:
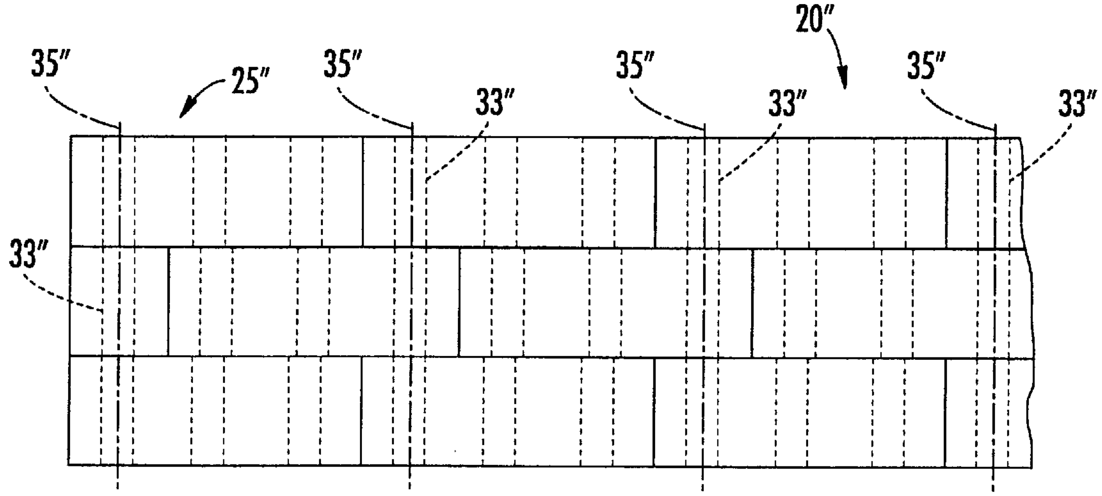
FIG. 8 is a side elevational view of a wall portion constructed using aerated concrete blocks of the type shown in FIG. 5 and schematically illustrating alignment of passageways of adjacent blocks to define vertical reinforcing member receiving channels.

Turning now to the elevational views of FIGS. 6–8, the patterns of block alignment are further described. As shown in the wall portion 20 of FIG. 6, the blocks 25 are of the type described above with reference to FIGS. 1–3 and include first and second passageways centered inwardly from opposing sides, with their axes positioned inwardly from respective ends a distance of one-half the width, and wherein the length of the block is about twice the width. Of interest, all of the passageways align with passageways of adjacent blocks to provide the receiving channels 33 for receiving the reinforcing members 35 as shown. For a twenty-four inch block length, this provides a receiving channel 33 every twenty-four inches along the wall. Not every channel 33 need necessarily be filled with a vertical reinforcing member 35.

The wall portion 20' shown in FIG. 7 is based on a version of the aerated concrete blocks 25' described above with reference to FIG. 4, wherein the blocks have the passageways centered inwardly from opposing sides, with their axes positioned inwardly from opposing ends a distance of one-half the width, and wherein the length is equal to 2.4 times the width. This may be provided by a block 25' having a width of ten inches and a length of twenty-four inches, for example. As can be seen in the wall portion 20' alignment is provided between the passageways in adjacent blocks on a periodic basis, although not all passageways in adjacent blocks are aligned. However, each block 25 is aligned to be secured by one vertical reinforcing member 35' to the adjacent block(s).

The wall portion 20" of FIG. 8 uses aerated concrete blocks 25" having three passageways therein as described above with reference to FIG. 5. In addition, the first and second, or end passageways are centered inwardly from opposing sides, and their axes are positioned inwardly from respective ends a distance of about one-half the width. The third or central passageway is centered between the two end passageways, and the length of the block is about three times the width. For example, the blocks 25" may have a width of about eight inches and a length of about twenty-four inches. This provides for the alignment of adjacent passageways, and, hence, the defining of reinforcing receiving channels 33" in the pattern illustrated. Again each block 25" is secured to the adjacent block(s) by one vertical reinforcing member 35". As will also be appreciated by those skilled in the art, not all of the vertical reinforcing members 35" need be used as long as the minimum lateral spacing requirement is met.

Figure 9:
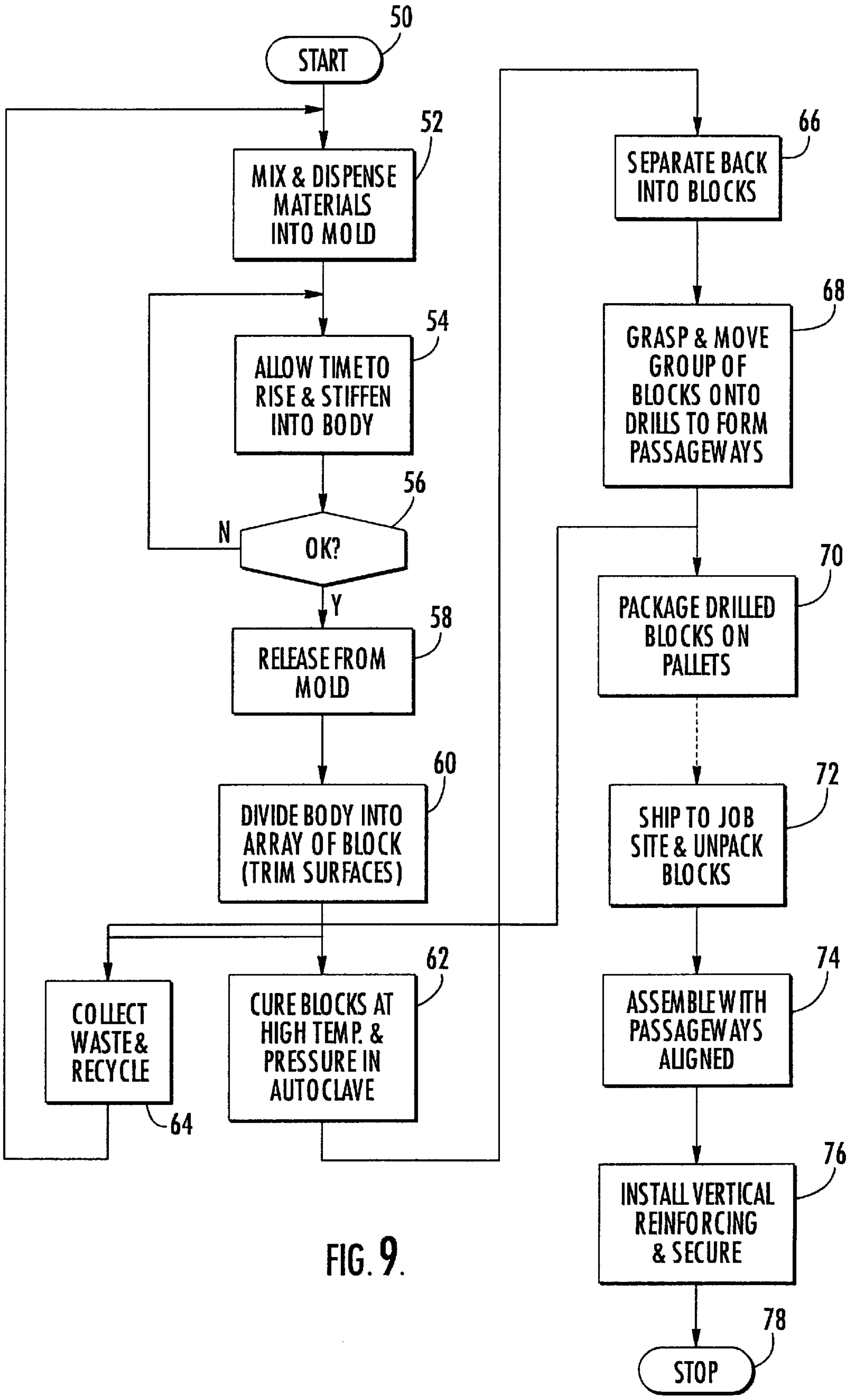
FIG. 9 is a simplified flow chart for an embodiment of a method for making the aerated concrete blocks in accordance with the present invention.
Figure 10A:
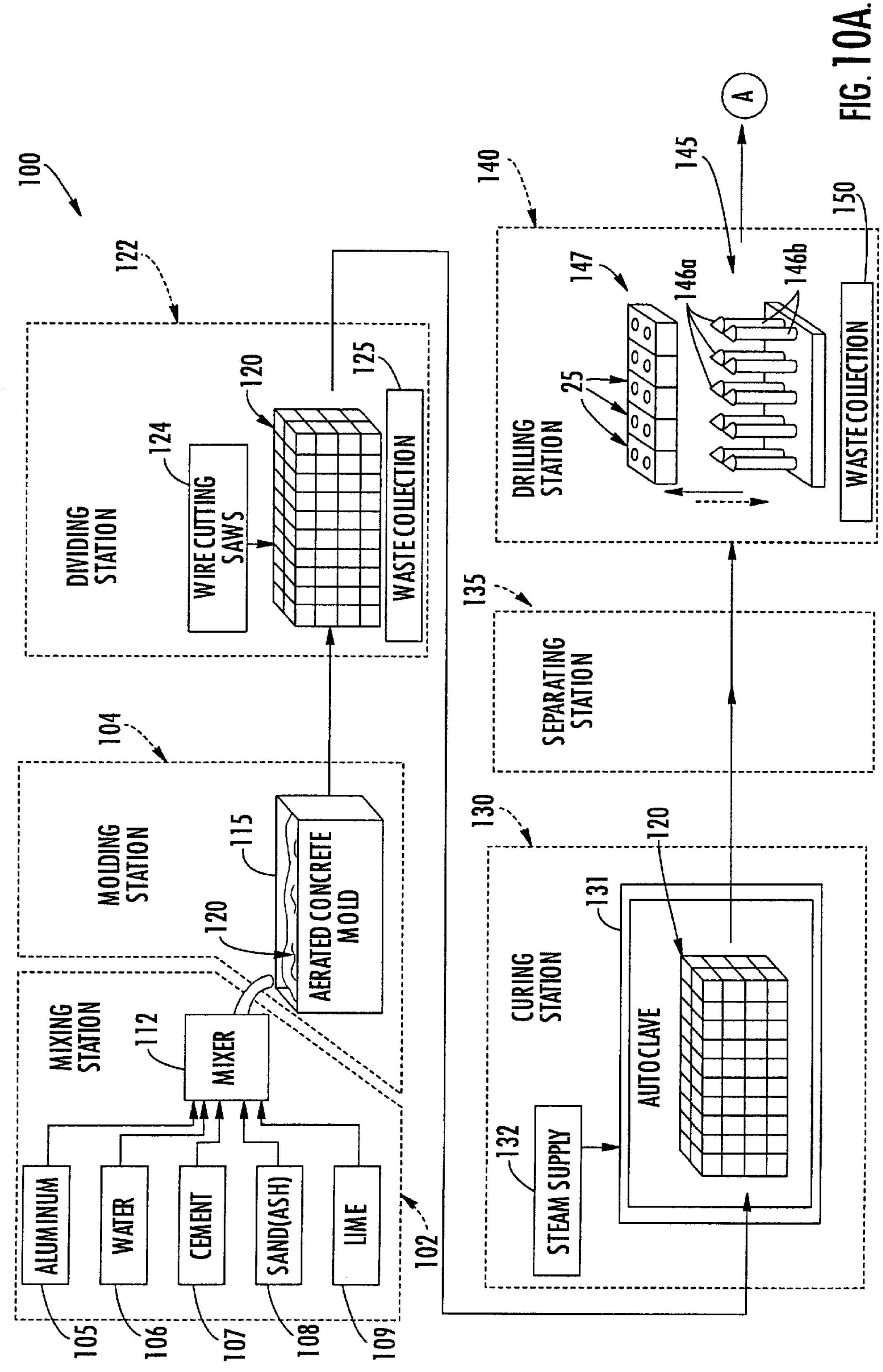
FIGS. 10A and 10B is a schematic block diagram of the manufacturing system illustrating the various processing stations for making aerated concrete blocks in accordance with the present invention.
Figure 10B:
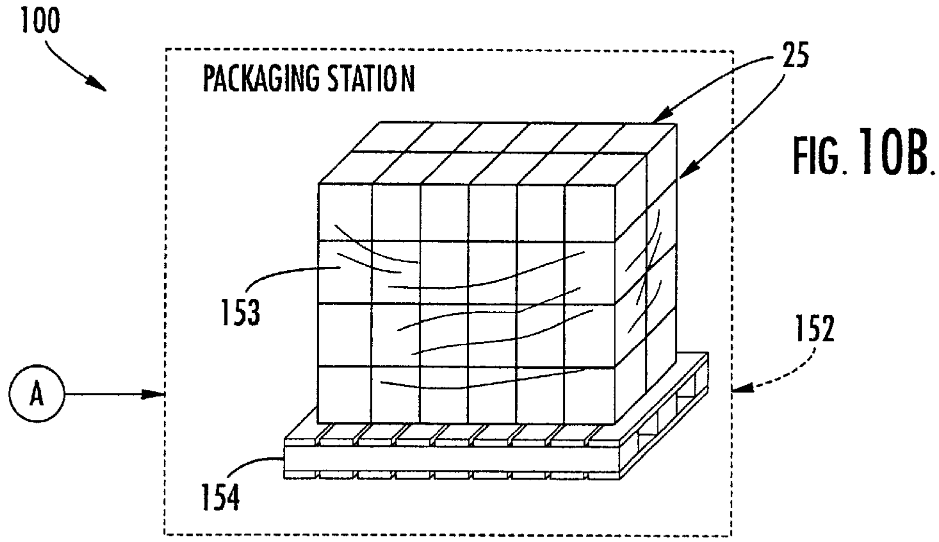

Referring now additionally to FIGS. 9–10B, the basic method and overall system for making the aerated concrete blocks 25, 25' and 25" in accordance with the invention are now described. From the start, represented by Block 50 of the flowchart of FIG. 9, the starting materials for making aerated concrete are mixed and dispensed into a mold (Block 52). More particularly, as schematically illustrated the manufacturing system 100 includes a mixing station 102 which, in turn, including a mixer 112 connected to supplies 105–109 of the starting materials. These supplies include: an aluminum or other aeration agent supply 105, a water supply 106, a cement supply 107, a sand or fly ash supply 108, and a lime supply 109. The materials are supplied to a mixer 112 and are then dispensed into the aerated concrete mold 115 of the molding station. The materials and their relative percentages are conventional as will be appreciated by those skilled in the art. Accordingly, these materials need no further discussion herein.

The materials are allowed to rise and stiffen into a semirigid body within the mold 115 as indicated at Block 54 and as will be appreciated by those skilled in the art. If sufficient stiffening has occurred as determined at Block 56, the semirigid body 120 is released from the mold (Block 58) and advanced to a downstream dividing station 122.

At the dividing station 122, the body 120 is divided into an array of blocks, such as using wire cutting saws 124 as will be appreciated by those skilled in the art. In addition to dividing the body 120 into an array of blocks, the saws 124 also typically trim the outermost surfaces of the body (Block 60). The waste trimmings may also be collected as indicated by Block 64 and as also shown by the schematically illustrated waste collection conveyor or system 125 of the dividing station 122. The waste may be readily recycled for additional production economies.

The now divided body of aerated concrete material is next advanced into an autoclave 131 of a curing station 130 as will also be appreciated by those skilled in the art. The autoclave 131 uses a combination of high pressure and temperature, for a predetermined curing time. For example, the autoclave may be connected to the schematically illustrated steam supply 132 to cure the array of blocks, as also indicated at Block 62 of the flowchart of FIG. 9. Other curing techniques are also contemplated by the present invention. The temperatures, pressures and curing times are conventional as will be appreciated by those skilled in the art and require no further discussion herein.

Since the curing typically causes some adherence of adjacent blocks to one another, a separation station 135 may be provided downstream of the curing station 130. The separation station 135 may including grasping and handling mechanisms, not shown, to again separate the blocks into discrete blocks as will be appreciated by those skilled in the art without requiring further discussion.

In accordance with one aspect of the present invention, the manufacturing system 100 includes a drilling station 140 downstream from the separating station 135. In the past, after separation the solid aerated concrete blocks could be packaged and sent to the job site for assembly into walls and other structures. Unfortunately, solid aerated concrete blocks present a number of difficulties to the construction industry—one significant difficulty being how to provide periodic vertical reinforcement to a wall constructed of such blocks to resist high wind forces. Indeed many building codes may require such reinforcements. For conventional hollow concrete blocks vertical reinforcing may take the form of one or more steel rods inserted into the aligned hollow interiors of the blocks. Additional concrete may then be poured to surround the vertical reinforcing members.

Unfortunately, for conventional aerated concrete blocks the manufacturing process presents a number of challenges to mold a hollow interior or passageway in the blocks. Accordingly, aerated concrete blocks, despite numerous advantages over conventional concrete blocks, may be difficult to fit with periodic vertical reinforcing at a building site. Indeed as noted in the above Background of the Invention, such reinforcements have been fitted in the field by cutting a vertical slot through the face of blocks forming the wall and inserting and securing a reinforcing member. Alternately, it has been attempted to drill an opening through the entire vertical height of the wall to then secure a vertical reinforcing member.

The manufacturing method and system 100 in accordance with the invention overcome these shortcomings of the prior art by providing a drilling station 140 to drill passageways through the blocks 25 as part of the manufacturing process. This provides a number of advantages including uniformity of manufacturing, lower costs, and ability to recycle waste material, etc. as will be appreciated by those skilled in the art. The blocks 25 themselves, with their preformed passageways can also be more readily handled by masons as described above. The aerated concrete material is readily drilled, unlike conventional concrete which would rapidly wear drilling or cutting surfaces.

The drilling station illustratively includes a drill assembly 145 which, in turn, includes a plurality of drills 146*a*, 146*b*. A waste collection system 150, such as including a conveyor, not shown, may also be provided to collect the waste from drilling. The drilling at Block 68 of the flowchart, may include causing relative movement between the drills and at least one group 147 of blocks 25 to simultaneously drill the one or more passageways in each block. More particularly, the drills 146*a*, 146*b* may be directed substantially vertically upward, and the group 147 of blocks 25 may be grasped and moved along a predetermined path of travel being substantially vertical so that waste from the drilling will fall by gravity for collection and recycling (Block 64). Recycling the drilling waste also reduces the costs of production as will be readily appreciated by those skilled in the art. An embodiment of the drilling station 140 is described in greater detail below.

The method may also include packaging the cured blocks after drilling to facilitate storage and transportation (Block 70) at the schematically illustrated packaging station 152 (FIG. 10B) of the system 100. For example, the packaging may comprise packaging blocks 25 on each of a plurality of pallets 154. The blocks 25 may be secured onto the pallet 154 in any conventional fashion, such as by wrapping at least with a plastic covering material or sheet 153. Other packaging arrangements are also contemplated by the present invention.

After manufacturing, the finished manufactured blocks 25 may be shipped to a building site and unpacked for use (Block 72). As described extensively above, the blocks 25 can be assembled into wall portions with the passageways aligned, such as to receive a vertical reinforcement (Block 76), before stopping at Block 78.

Figure 11:
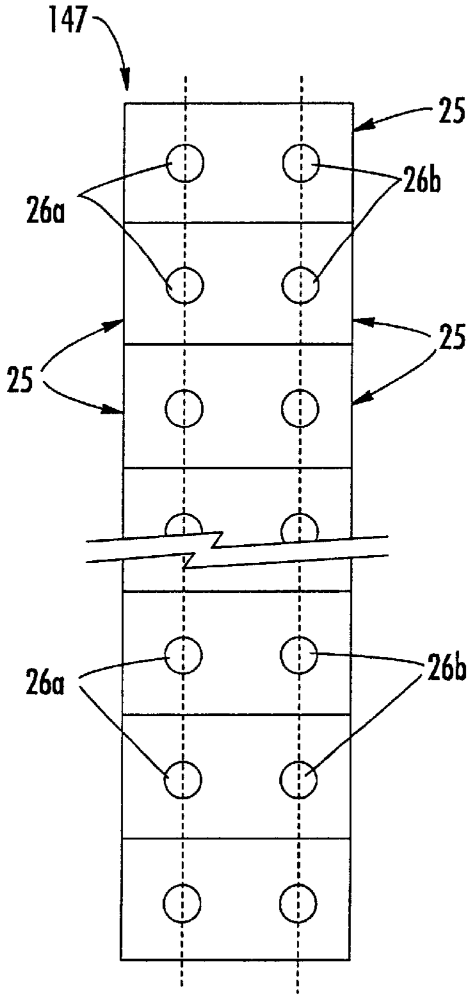
FIG. 11 is a schematic top plan view of a group of blocks after drilling of the passageways.
Figure 12:
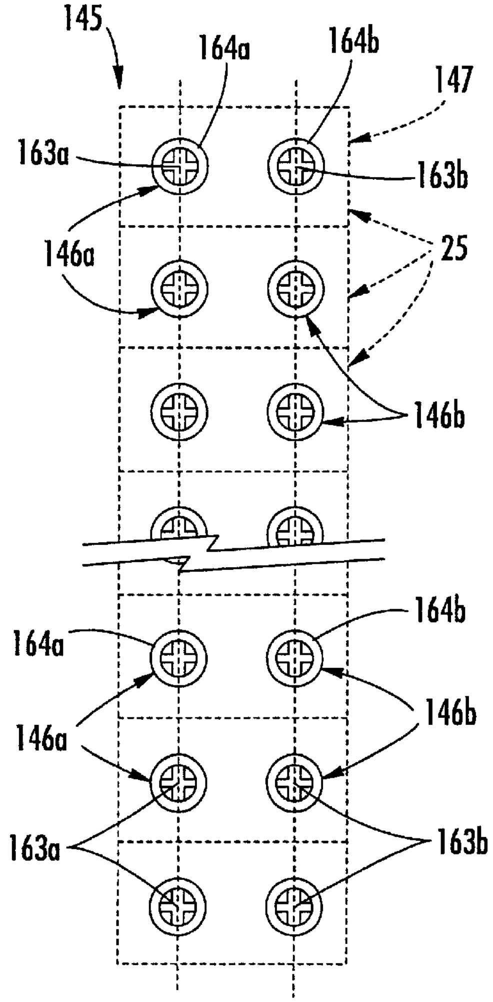
FIG. 12 is a schematic top plan view of some components of the drilling assembly of the drilling station used to drill the group of blocks as shown in FIG. 11.
Figure 13:
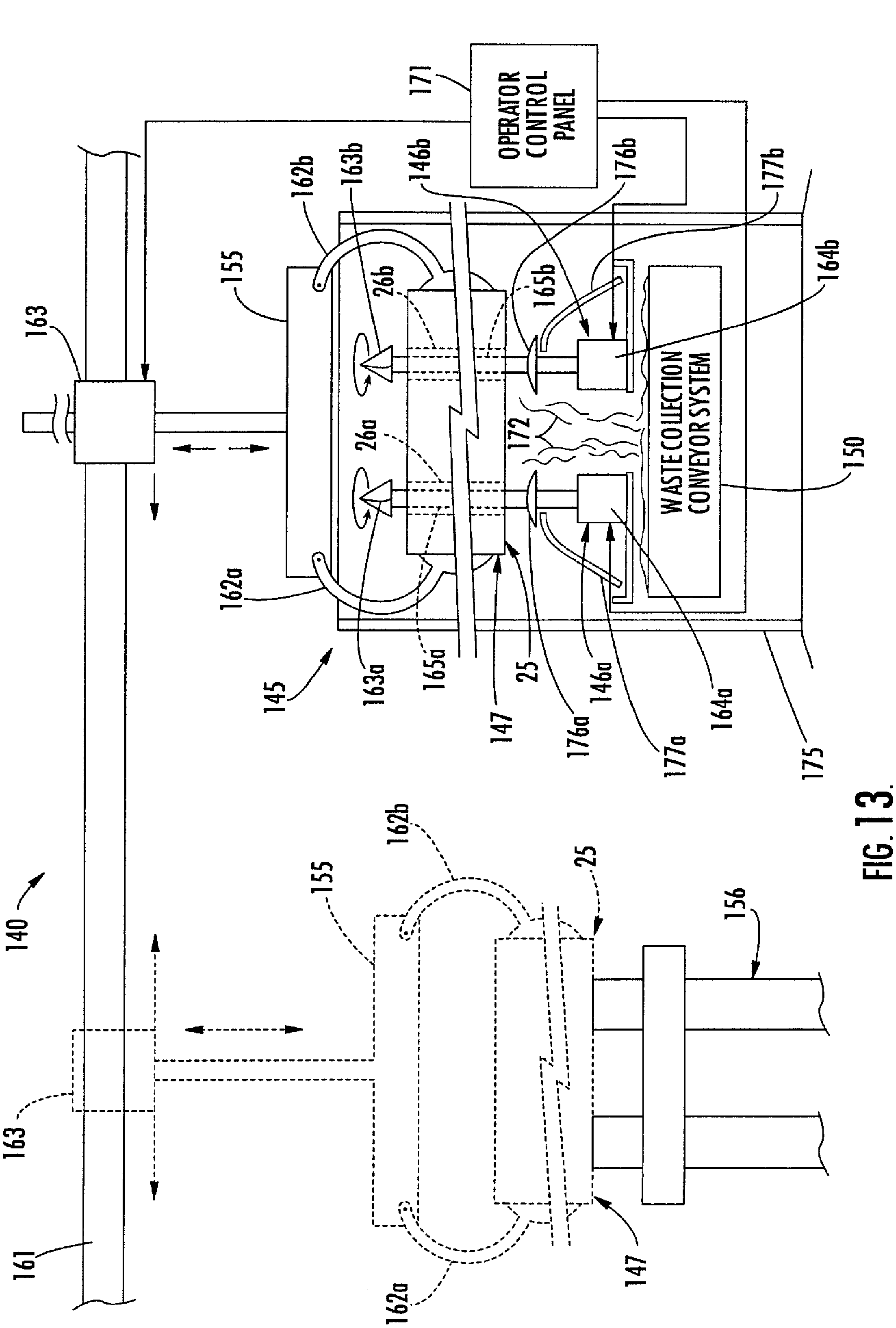
FIG. 13 is a more detailed schematic side elevational view of the drilling station of the system for making aerated concrete blocks in accordance with the present invention.

Turning now additionally to FIGS. 11–13, further details of an embodiment of drilling station 140 are now described. In the illustrated embodiment, a block group 147 is grasped by the gripping mechanism 152 from an intermediate or staging platform 156 and delivered to the drill assembly 145. The gripping mechanism 155 is supported by a carriage and its associated actuator(s) 163 which, in turn, are carried by an overhead rail 161. The carriage and actuator(s) 163 provide for lateral movement as well as vertical reciprocal movement, the details of which need no further discussion. The gripping mechanism 155 illustratively includes a series of clamping arms 162*a,* 162*b* carried along each side of the mechanism. These clamping arms 162*a,* 162*b* are selectively movable between clamped and retracted positions by actuators, not shown, and as will be readily understood by those skilled in the art.

Considered in other terms, these components define a positioner for moving the group 147 of blocks 25 along the predetermined path to drill the passageways 26*a,* 26*b*. Of course, in other embodiments, other arrangements may be used for moving the group of blocks. In addition, the drill assembly 145 could also be moved relative to the blocks to drill the passageways, or a combination of movement between the blocks and drill assembly could be provided as will be appreciated by those skilled in the art.

The drilling station 145 illustratively includes two rows of drills 146*a,* 146*b*. Of course, a single row, three rows or any number of rows could be provided. It may typically be relatively easy to grasp and position a block group 147 that includes a line of blocks 25 oriented in side-by-side relation and stacked one or more high as perhaps best appreciated with reference to FIG. 11. The number of blocks 25 in the group may be determined based on manufacturing throughput requirements. A typical drilling station 140 may include twenty-four pairs of drills 146*a,* 146*b* and may process a block group 147 including a line of about twenty-four blocks 25 stacked four high. In other words, an entire array of blocks from a given mold in the molding station or an entire "cake" can be processed at one time using the illustrated embodiment of the drilling station 140. As will be appreciated by those skilled in the art, a lesser or greater number of blocks 25 may also be processed in a group 147.

Focusing on just the left hand row of drills 146*a* for ease of explanation, each drill 146*a* includes a motor 164*a,* a shaft 165*a* having a proximal end coupled to the motor, and a cutting tip 163*a* carried at the distal end of the shaft. The motor 164*a* may be an electric motor which may be controlled by an operator using a control panel 171 as will be appreciated by those skilled in the art. The operator control panel 171 may also control the positioner as described above and as will also be appreciated by those skilled in the art.

As will be understood by those skilled in the art, a hydraulic or pneumatic motor may also be used in place of or in combination with the electric motors in other embodiments in accordance with the invention. An electric motor offers ruggedness, and controllability, although it may require a cooling air flow. A hydraulic motor may have cooling advantages, but may be relatively expensive. A pneumatic motor may produce air currents which undesirably disturb the waste material 172.

Gearing could also be used to drive a number of shafts and tips without the individual motors. In addition, although each drill 146*a,* 146*b* illustratively includes a cutting tip 163*a,* 163*b* of a type which abrades away all of the material through which it passes, in other embodiments a cutting tip having a tubular configuration, such as generally known as a hole saw, may also be used. Further, although the illustrated drills provide for rotating contact with the blocks 25, drilling may alternately or additionally include an impacting action in some embodiments. In yet other embodiments, the drilling may be accomplished using a flow of gas or liquid to abrade away the material, and the term "drilling" would encompass such techniques as will be appreciated by those skilled in the art. It is contemplated in other embodiments, that an energy beam could also be used to drill the passageways.

The drilling station 140 also illustratively includes a protective shroud or screen surrounding the drills 146*a,* 146*b*. A flange 176*a,* 176*b* may be provided to shield the motor from falling waste material 172. In addition, sloped walls 177*a,* 177*b* may be provided adjacent the drills 146*a,* 146*b* to further shield the motors 164*a,* 164*b* as will also be appreciated by those skilled in the art.

A number of commercial equipment manufacturers can supply the equipment described herein. For example, Wehrhan of Delmenhorst, Germany provides equipment for aerated concrete production.

Although drilling has been described as one preferred embodiment to forming the passageways, there are other techniques for generally forming such passageways during the manufacturing process as will be appreciated by those skilled in the art. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A method for making aerated concrete blocks having at least one passageway extending therethrough, the method comprising:

providing a plurality of aerated concrete blocks;

separating the plurality of aerated concrete blocks into a plurality of groups of aerated concrete blocks;

providing a drilling station comprising a plurality of drills; and simultaneously drilling a plurality of spaced apart passageways extending through each of the blocks of one of the groups of aerated concrete blocks by causing relative movement between the one group of aerated concrete blocks and the plurality of drills.

2. A method according to claim 1 wherein each passageway has a circular cylindrical shape.

3. A method according to claim 1 further comprising packaging the blocks for storage and transportation after drilling.

4. A method according to claim 1 further comprising recycling waste generated at least during drilling.

5. A method according to claim 1 wherein causing relative movement comprises grasping and moving the one group of blocks along a predetermined path relative to the plurality of drills while the plurality of drills are stationary.

6. A method according to claim 5 wherein the drills are directed substantially vertically upward, and wherein the predetermined path is substantially vertical so that waste from drilling will fall by gravity for recycling.

7. A method for making aerated concrete blocks comprising:

mixing together materials for making aerated concrete;

allowing the materials to rise and stiffen into a body after mixing;

processing the body to form a plurality of blocks;

separating the plurality of blocks into a plurality of groups of blocks; and drilling at least one passageway extending through each of the blocks of one of the groups of blocks by providing a plurality of drills and causing relative movement between the drills and the one group of blocks to simultaneously drill the at least one passageway extending through each of the blocks of the one group of blocks.

8. A method according to claim 7 wherein drilling at least one passageway is performed after processing.

9. A method according to claim 7 wherein drilling at least one passageway comprises forming a plurality of spaced apart passageways through each block.

10. A method according to claim 7 wherein each passageway has a circular cylindrical shape.

11. A method according to claim 7 further comprising packaging the blocks for storage and transportation.

12. A method according to claim 7 further comprising recycling waste generated at least during drilling at least one passageway.

13. A method according to claim 7 wherein processing comprises dividing the body into an array of blocks and curing the array of blocks; and wherein separating comprises separating the array of blocks into a plurality of groups of blocks.

14. A method according to claim 7 wherein causing relative movement comprises grasping and moving the one group of blocks along a predetermined path relative to the plurality of drills while the plurality of drills are stationary.

15. A method according to claim 14 wherein the drills are directed substantially vertically upward, and wherein the predetermined path is substantially vertical so that waste from drilling will fall by gravity for recycling.

16. A method according to claim 7 further comprising mixing the materials prior to dispensing the materials into the mold.

17. A method according to claim 16 wherein mixing the materials comprises mixing sand or ash, cement, lime, water, and an aeration agent together.

18. A method for making aerated concrete blocks comprising:

dispensing material for making aerated concrete into a mold and allowing the materials to rise and stiffen into a body;

dividing the body into an array of blocks;

curing the array of blocks;

separating the array of blocks into a plurality of groups of blocks; and drilling at least one passageway extending through each of the blocks of one of the groups of blocks after curing by providing a plurality of drills and causing relative movement between the drills and the one group of blocks to simultaneously drill the at least one passageway extending through each of the blocks of the one group of blocks.

19. A method according to claim 18 wherein drilling the at least one passageway comprises drilling a plurality of spaced apart passageways through each of the blocks of the one group of blocks.

20. A method according to claim 18 wherein each passageway has a circular cylindrical shape.

21. A method according to claim 18 further comprising recycling waste generated at least during drilling of the at least one passageway.

22. A method according to claim 18 further comprising releasing the body from the mold prior to dividing the body.

23. A method according to claim 18 further comprising trimming at least one surface of the body during the dividing.

24. A method according to claim 18 wherein dividing comprises forming a series of laterally extending and vertically extending cuts through the body.

25. A method according to claim 18 wherein curing comprises subjecting the array of blocks to an elevated temperature and an elevated pressure for a predetermined time.

26. A method according to claim 18 wherein causing relative movement comprises grasping and moving the one group of blocks along a predetermined path relative to the plurality of drills while the plurality of drills are stationary.

27. A method according to claim 26 wherein the drills are directed substantially vertically upward, and wherein the predetermined path is substantially vertical so that waste from drilling will fall by gravity for recycling.

28. A method according to claim 18 further comprising packaging the blocks for storage and transportation after drilling the at least one passageway.

29. A method according to claim 28 wherein packaging comprises packaging the blocks on shipping pallets.

30. A method according to claim 18 wherein each of the blocks of the one group of blocks has a generally rectangular shape defining a length between opposing ends, a width between opposing sides, and a height between a top and bottom; and wherein the at least one passageway comprises first and second passageways extending in the height direction, with each of the first and second passageways being centered inwardly from the opposing sides and also having an axis positioned inwardly from a respective adjacent end a distance of about one-half the width.

31. A method according to claim 30 wherein the at least one passageway further comprises a third passageway extending in the height direction, being centered inwardly from opposing sides, and being centered inwardly from opposing ends.

32. A method according to claim 18 further comprising mixing the materials prior to dispensing the materials into the mold.

33. A method according to claim 32 wherein mixing the materials comprises mixing sand or ash, cement, lime, water, and an aeration agent together.

34. A method according to claim 18 wherein each of the blocks of the one group of blocks has a generally rectangular shape defining a length between opposing ends, a width between opposing sides, and a height between a top and bottom; and wherein the at least one passageway extends in the height direction, is centered inwardly from opposing sides, and also has an axis positioned inwardly from an adjacent end a distance of about one-half the width to facilitate alignment with a corresponding passageway of an adjacent block at a wall corner.

35. A method according to claim 34 wherein the length is in a range of about two to three times the width.

36. A method according to claim 34 wherein the length is in a range of about 16 to 24 inches, the width is in a range of about 8 to 12 inches, and the height is in a range of about 8 to 12 inches.

37. A method for making aerated concrete blocks comprising:

dispensing material for making aerated concrete into a mold and allowing the materials to rise and stiffen into a body;

dividing the body into an array of blocks;

curing the array of blocks;

separating the array of blocks into a plurality of groups of blocks; and simultaneously drilling a plurality of spaced apart passageways extending through each of the blocks of one of the groups of blocks after curing by causing relative movement between the one group of blocks and a plurality of drills.

38. A method according to claim 37 wherein each passageway has a circular cylindrical shape.

39. A method according to claim 37 further comprising packaging the blocks for storage and transportation after drilling.

40. A method according to claim 37 further comprising recycling waste generated at least during drilling.

41. A method according to claim 37 wherein curing comprises subjecting the array of blocks to an elevated temperature and an elevated pressure for a predetermined time.

42. A method according to claim 37 wherein causing relative movement comprises grasping and moving the one group of blocks along a predetermined path relative to the plurality of drills while the plurality of drills are stationary.

43. A method according to claim 42 wherein the drills are directed substantially vertically upward, and wherein the predetermined path is substantially vertical so that waste from drilling will fall by gravity for recycling.

44. A method according to claim 37 further comprising mixing the materials prior to dispensing the materials into the mold.

45. A method according to claim 44 wherein mixing the materials comprises mixing sand or ash, cement, lime, water, and an aeration agent together.

* * * * *